(12) United States Patent
Vogt et al.

(10) Patent No.: US 10,514,764 B2
(45) Date of Patent: Dec. 24, 2019

(54) OPERATING UNIT FOR A VEHICLE

(71) Applicant: BEHR-HELLA THERMOCONTROL GMBH, Stuttgart (DE)

(72) Inventors: Frank Vogt, Lichtenau-Husen (DE); Alexander Beschnitt, Herford (DE); Markus Karliczek, Bergkamen (DE); Udo Treuguth, Bad Westernkotten (DE)

(73) Assignee: BEHR-HELLA THERMOCONTROL GMBH, Stuttgart (DE)

( * ) Notice: Subject to any disclaimer, the term of this patent is extended or adjusted under 35 U.S.C. 154(b) by 0 days.

(21) Appl. No.: 16/072,764

(22) PCT Filed: Jan. 24, 2017

(86) PCT No.: PCT/EP2017/051416
§ 371 (c)(1),
(2) Date: Jul. 25, 2018

(87) PCT Pub. No.: WO2017/129557
PCT Pub. Date: Aug. 3, 2017

(65) Prior Publication Data
US 2019/0033973 A1  Jan. 31, 2019

(30) Foreign Application Priority Data

Jan. 28, 2016  (DE) .................. 10 2016 101 556

(51) Int. Cl.
*G09G 5/00* (2006.01)
*G06F 3/01* (2006.01)
(Continued)

(52) U.S. Cl.
CPC .............. *G06F 3/016* (2013.01); *B60K 37/06* (2013.01); *G05G 5/03* (2013.01); *B60K 2370/143* (2019.05); *G06F 3/041* (2013.01)

(58) Field of Classification Search
None
See application file for complete search history.

(56) References Cited

U.S. PATENT DOCUMENTS

2008/0117166 A1* 5/2008 Rosenberg .............. F41A 17/06
345/156
2015/0291034 A1 10/2015 Marquas
(Continued)

FOREIGN PATENT DOCUMENTS

DE        102009007243 A1    8/2010
DE    10 2012 221 107 B3    5/2014
(Continued)

OTHER PUBLICATIONS

International Search Report issued in Application No. PCT/EP2017/051416 dated Aug. 3, 2017, with English translation.
(Continued)

*Primary Examiner* — Adam R. Giesy
(74) *Attorney, Agent, or Firm* — Morgan, Lewis & Bockius LLP

(57) ABSTRACT

An operating unit for a vehicle, e.g., an infotainment system for controlling diverse vehicle components, can include a housing and an operating element mounted in a spring-elastic manner on and/or in the housing along a vertical axis of movement extending substantially orthogonally to the operating surface and along a lateral axis of movement extending substantially transversely to the vertical axis of movement. The operating unit can also include at least one sensor for detecting an actuating movement of the operating element in the direction of the vertical axis of movement and an actuator arranged in and/or on the housing for the feedback movement of the operating element at least also in the lateral axis of movement during a detected actuating
(Continued)

Figure 1:
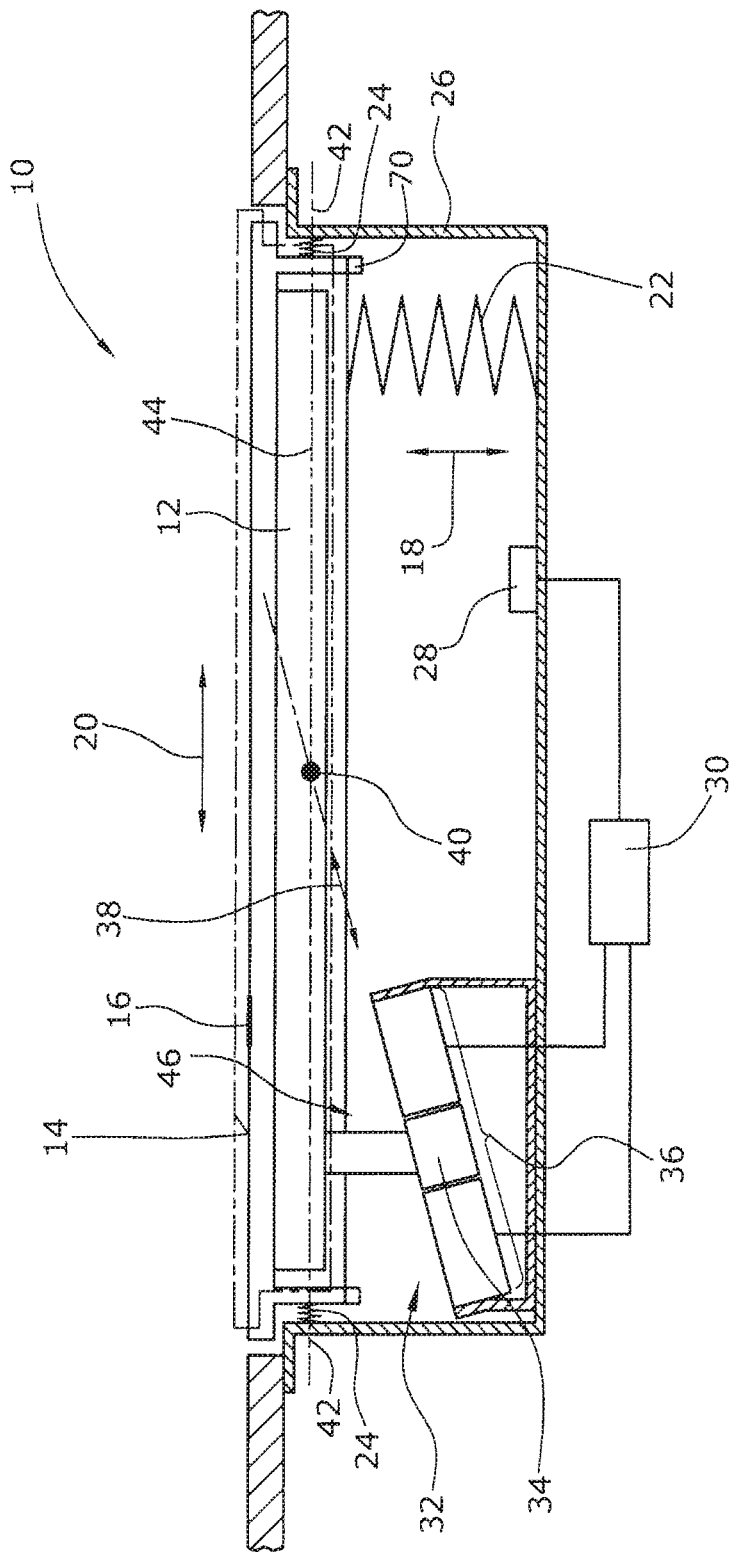

movement of the operating element, and a spring frame for the spring-elastic mounting of the operating element.

11 Claims, 6 Drawing Sheets

(51) Int. Cl.
  *B60K 37/06* (2006.01)
  *G05G 5/03* (2008.04)
  *G06F 3/041* (2006.01)

(56) References Cited

U.S. PATENT DOCUMENTS

| 2016/0035504 | A1 | 2/2016 | Bleckmann et al. | |
| 2016/0195931 | A1* | 7/2016 | Czelnik | G06F 3/016 |
| | | | | 345/173 |
| 2018/0348865 | A1* | 12/2018 | Czelnik | B60K 37/06 |

FOREIGN PATENT DOCUMENTS

| DE | 10 2013 006 414 A1 | 10/2014 |
| EP | 3043240 A1 | 7/2016 |

OTHER PUBLICATIONS

Written Opinion of International Search Authority issued in Application No. PCT/EP2017/051415 dated Aug. 3, 2017.

\* cited by examiner

OPERATING UNIT FOR A VEHICLE

RELATED APPLICATIONS

This application is a national stage of International Application No. PCT/EP2017/051416, filed Jan. 24, 2017, which claims the benefit of German Application No. 10 2016 101 556.3, filed on Jan. 28, 2016, the disclosures of which are incorporated in their entirety by reference herein.

Operating units comprising operating elements of the display type adapted to display, e.g. controlled by a menu, various symbol fields for the selecting of functions for a vehicle component, enjoy increasing popularity. In such operating units, the operating person is to be given a tactile confirmation of the selection of a function, which is realized e.g. by an additional active movement of the operating element subsequent to its actuation, wherein the actuation is accompanied by a—particularly hardly perceivable—movement of the operating element. This haptic feedback, when viewed across the entire operating surface of the operating element, should be as homogenous as possible. The above mentioned concept is also known as Force Sense Force Feedback. The design of the operating unit requires an elastic support of the operating element possibly along two different axes, which may be overly complex, especially if the operating element, e.g. due to its size and the number of its components, has a relatively large proper weight. On the one hand, the spring-elastic support has to be stiff enough to prevent vibration of the operating element due to vehicle movements during driving; on the other hand, the elastic support for the tactile feedback should be "soft" enough so that the energy demand for the mechanical excitation of the operating element is not too high.

An operating unit with haptic feedback upon touching a key area by lateral excitation of the latter is known from DE-A-10 2009 007 243.

From the post-published EP-A-3 043 240 (corresponding to DE-A-10 2015 200 037), an operating device for an automobile is known that comprises a housing having a touch screen arranged on its front side for use as an operating element with an operating surface. The touch screen is resiliently movable in vertical direction and in lateral direction. An actor is operative to cause an actuation feedback movement of the operating element in lateral direction, wherein its electromechanical design comprises an electromagnetically controllable drive element which is coupled to the touch screen. A haptic control device forms an evaluating and control unit with inclusion of sensor elements which, upon deflection of the operating surface of the touch screen in vertical direction, will trigger a signal. The elastic lateral support of the touch screen is realized by means of leaf springs.

It is an object of the invention to provide an operating unit for a vehicle which has at least one operating element with operating surface, wherein the operating element shall comprise an elastic support having a favorable technical design and being easy to install.

To achieve the above object, there is provided, according to the invention, an operating unit for a vehicle, said operating unit comprising a housing having a front side, an operating element arranged on the front side of the housing, which has an operating surface, wherein the operating element is mounted in a spring-elastic manner on and/or in the housing along a vertical axis of movement extending substantially orthogonally to the operating surface and along a lateral axis of movement extending substantially transversely to the vertical axis of movement, at least one sensor for detecting an actuating movement of the operating element in the direction of the vertical axis of movement, an actuator arranged in and/or on the housing for feedback movement of the operating element at least also in the lateral axis of movement upon a detected actuating movement of the operating element, wherein the actuator comprises an electromagnetically controllable drive element mechanically coupled to the operating element and being movable forth and/or back, an evaluating and control unit connected to the sensor and the actuator, and a spring frame for spring-elastic support of the operating element, wherein the spring frame comprises two transverse frame sections extending transversely to the lateral axis of movement and each having at least one leaf spring arm arranged in it, wherein each leaf spring arm comprises a first end connected to the spring frame and a free second end, wherein each leaf spring arm extends in a vertical plane and the lateral axis of movement extends transversely to said vertical plane, wherein each leaf spring arm is also spring-elastic in the vertical plane, and wherein the operating element is fixed to the spring frame outside the leaf spring arms of the spring frame, and the free second ends of the leaf spring arms of the spring frame are fixed to the housing.

According to the invention, the active haptic feedback of an actuation of the operating element is realized by a lateral deflection of the operating element. For actuation, the operating element is moved in a vertical axis of movement extending substantially orthogonally to the operating surface. When this actuating movement is then detected via a sensor, there will occur an active movement of the operating element that comprises a lateral movement component, i.e., in general terms, a movement component oriented transversely to the vertical axis of movement (e.g. to the left or the right, upward or downward). The force feedback movement can, however, also be purely lateral. For these purposes, the invention provides, as a constructional element, a spring frame for spring-elastic support of the operating element on the housing. The spring frame takes over the elastic connection of the operating element both in vertical and lateral directions. For this purpose, it is provided according to the invention that the spring frame comprises two transverse frame sections extending transversely to the lateral axis of movement. In each of said transverse frame sections, a leaf spring arm is arranged which comprises a first end connected to the spring frame, and a free second end. Each leaf spring arm extends in a vertical plane relative to which the lateral axis of movement extends transversely. Both within the vertical plane, i.e. in the direction of the vertical axis of movement, and in the direction of the lateral axis of movement, each spring leaf arm is spring-elastic. Generally, it applies that, due to the excitation of the operating element for the haptic feedback, the resulting movement of the operating element occurs in the form of a lateral main movement and a secondary movement that is normal to the operating surface. Depending on the respective angle of attack of the excitation, the normal movement component can vary in its amount. Thus, there does not take place a pure lateral movement.

Each leaf spring arm is suitably designed as a portion of the respective transverse frame section of the spring frame that is cut free except for its first end which is integrally connected to the spring frame. Thus, each spring frame is designed in the manner of a bending bar clamped on one side that can have higher stiffness in the direction of the extension of the vertical axis of movement than in the direction transverse thereto, i.e. in the direction of the extension of the lateral axis of movement. Further, it can be provided that the two stiffnesses are equal, notably in dependence on the respective requirements on the haptics of the operation of the operating element. The stiff connection of the operating element in the vertical moving direction has the effect that the press-down movement of the operating element during its actuation will hardly be perceived by the user, which is haptically advantageous. The tactile feedback is not dependent solely on the spring but on the system response of the mass being moved, i.e. on the movement and the path at the point of actuation on the operating surface over time. The system response in turn is dependent on the energy that is impressed into the system, and on the signal form (controlling) by which it is impressed. Additional stiffnesses of the system will have an effect as well. Thus, for instance, nominal curves of the system response may be predefined independently from the spring and the mass.

A "soft" connection in case of a large mass is to be understood in the sense that only little energy has to be applied for moving the mass whereas more energy must be applied to move the large mass back again into its initial position (In addition, oscillation or vibration problems will occur). A "hard" spring and respectively connection is to be understood in the sense that much energy must be applied for excitation of the mass whereas only little energy is required to "fetch back" mass back into its initial position. The higher spring force will support this return movement wherein, advantageously, the oscillation problems are reduced. Generally, a system with hard and soft spring may behave, under the haptic aspect, substantially in the same manner, depending on the control.

In accordance with the invention, the two elastic supports of the operating element, acting in different directions, are realized by a single component, namely the spring frame preferably made of metal. This is of advantage with respect to the production costs and assembly. A further reason for the use of metal for the spring arm is to be seen in the stiffness. The actuator is operative to act on the frame. The softer the frame is, the more relative bending and the less moving distance at the point of actuation will exist. Further, a stiffer spring frame material is of advantage for the tolerances to be kept.

According to an advantageous embodiment of the invention, it can further be provided that each leaf spring arm comprises at least one cutout, closed on all sides, for forming at least two leaf spring webs. Thus, each leaf spring arm is designed in the manner of a parallelogram wherein, in the corners of the parallelogram, no joints are arranged while, instead, the two leaf spring webs are rigidly coupled to each other at both ends of the respective leaf spring arm. This configuration in turn entails the advantage of parallel kinematics which will distinctly improve the homogeneity upon actuation in the normal direction. The advantage is evident particularly is the operating surface is acted on in its corner regions. The kinematics will reduce the tilting of the actuated operating element. This has a positive effect on the haptic feel and the perceived value of the device, notably inter alia also since the run of the gaps toward rigidly fixed components surrounding the operating element is subjected to only few optical obstacles.

According to an embodiment with simplified design, the spring frame is rectangular and comprises two longitudinal frame sections extending parallel to the lateral axis of movement of the operating element, and two transverse frame sections extending transversely to the lateral axis of movement and each having at least one leaf spring arm formed on and/or in them. Also non-rectangular spring frames can be used such as e.g. free-form displays with force feedback, which then comprise a surrounding non-rectangular spring frame. The cover glass forming the operating surface could have any desired contour (curved and bent in several directions). In such a case, the spring frame would not be just rectangular anymore.

For reasons of the lateral displaceability of the at least one operating element, this element must have a play relative to the housing and the adjacent structure to which the housing is fastened. Thus, in the lateral moving direction, gaps exist laterally of the operating element. It is suitable to provide such gaps also on the other edge sections of the operating element. Also, care should be taken that the operating element extends e.g. flush with the surface of the structure to which the housing is fastened.

In so far, it is advantageous if the attachment of the spring frame to the housing and respectively the attachment of the operating element to the spring frame is possible with compensation of mounting tolerances. For this purpose, it can be advantageously provided that the free end of each leaf spring arm and/or the housing comprises at least one receiving opening for a fastening element, extending through the receiving opening, for fastening the respective leaf spring arm to the housing, wherein, for compensation of mounting tolerances, the fastening element extends through the receiving opening with play. Suitably, the fastening element for attachment of a leaf spring arm to the housing and respectively the operating element is a screw or a bolt, wherein the fastening element is seated with play in a receiving opening of the free end of the respective leaf spring arm. Said play can be used to establish a rigid connection of the spring frame to the housing and respectively the operating element only after adjustment. Thus, in this manner, it is possible to perform a height adjustment of the operating element as well as a lateral adjustment on the longitudinal frame sections of the spring frame. On the transverse frame sections of the spring frame, there takes place a lateral self-centering of the operating element relative to the housing, notably due to the leaf spring arms. Accordingly, the size of the gap around the operating element can thus be set in a precise and uniform manner, notably during the mounting process and prior to the fixing of the spring frame to the housing and respectively to the operating element. In so far, it is suitable if the two leaf spring arms are oriented in opposite senses to each other, i.e. the first and second ends of the leaf spring arms are arranged alternately on different sides of the longitudinal central axis of the operating element extending in the lateral moving axis direction. This leads to further advantages with respect to the lateral self-adjustment of the operating element.

According to a further aspect of the invention, it is an object of the invention to cause the active tactile response for the haptic feedback to act on the operating element in such a manner that the haptic feedback feel will be substantially uniform irrespective of the site where the operating surface is touched and actuated.

For this purpose, it is provided according to one embodiment of the invention that the center of mass of the operating element is situated on the axis of effective movement of the drive element of the actuator. It can also be provided that the effective axis extends past the center of mass at a close distance.

As already mentioned above, the active haptic feedback of an actuation of the operating element is realized by a deflection of the operating element with lateral movement component.

In this respect, care has to be taken that the operating element, when being laterally deflected, will not tilt, which can however be excluded without special measures if—which is normally the case—the actuator is not connected with the operating element in the center of mass of the latter. The operating element substantially comprises a display with corresponding display technique and technology (e.g. an LCD display) and with backlighting so that it may have a not inconsiderable construction depth. Since, in the ideal case, the actuator can only be arranged directly below this operating element, its drive element for active haptic feedback movement engages the operating element in the lateral moving direction outside the center of mass of the operating element. As a result, unless adequate measures are taken, there will occur an undesired tilting of the operating element due to the effects of the moments caused by the force of the actuator and the geometric lever relative to the center of mass. As a consequence of the tilting, the operating element would "feel" differently to the operating person at each site of its operating surface. Known solutions aim at a forced guidance with corresponding design of the spring system by which the operating element is supported on the housing of the operating unit, or at a parameterized control of the actuator in dependence on the site of the actuation of the operating element by the operating person. Mechanically, and under the aspect of control technology, all these approaches are overly complex.

For this reason, it is provided according to a variant of the invention to arrange the actuator mechanically with such an orientation that the axis of effective movement of the drive element intersects with the center of mass of the operating element. Thus, the center of mass of the operating element is arranged on the extension of the effective axis of movement of the drive element. Accordingly, in this configuration, the effective axis of movement of the operating element is oriented at an acute angle relative to the desired lateral moving direction for the active haptic feedback. Since the operating element is thus moved along the effective axis of movement of the operating element, the feedback movement of the operating element comprises, apart from the intended lateral movement component, also a vertical movement component, which, however, has hardly any disturbing effect. Instead, what is decisive is that, during the active haptic feedback, the operating surface of the operating element will maintain its orientation in space, i.e. is subjected to an oblique parallel displacement.

This measure makes it possible to perform the active haptic feedback movement in a purely translational manner; this is because the effective direction of the drive element extends through the center of mass of the operating element.

Rotatory movement components during active haptic feedback of the operating element will be further reduced in that the leaf spring arms by which the operating element after an active haptic feedback are returned into the initial position, are arranged in a common plane that is parallel to the operating surface and includes the center of mass of the operating element. If this were not the case, the pattern of the active haptic feedback movement would comprise rotatory components.

Further, it is advantageous to control or feedback-control the haptics in the outbound path and the return path in an active manner. One decisive factor for this is that the movement of the operating element should be, as far as possibly, purely translational, which can be realized by this variant of the invention. Further, it can be substantially safeguarded in this manner that the haptic feel will always be identical irrespective of the actuation site on the operating surface. Therefore, no need exists anymore for complex constructional solutions for elastic support of the operating element to the effect that the latter will perform a purely translational movement.

It is suitable if the lateral axis of movement of the operating element and the effective axis of movement of the drive element of the actuator are arranged to span a common vertical plane oriented substantially orthogonally to the operating surface.

According to a further embodiment of the invention, it can be provided that, below the operating element, the housing comprises an installation space and that the actuator, for obtaining a smallest possible angle between the effective axis of movement of the drive element of the actuator and the lateral axis of movement of the operating element, is arranged below the operating element as closely as allowable by the installation space, and/or is arranged as remote from the center of mass of the operating element as allowable by the installation space. The smaller the angle between the effective axis of movement of the actuator and of the lateral axis of movement of the operating element is, the larger is the lateral movement percentage of the operating element in relation to the lateral movement percentage in the feedback movement.

According to a further embodiment of the invention, the spring effective axes of the leaf spring arms provided for realizing the lateral movement of the operating element, are situated on the lateral axis of movement or in a plane extending substantially orthogonally to the plane spanned by the axis of effective movement of the drive element of the actuator and by the lateral axis of movement of the operating element.

Further, it can be provided that the actuator, as a tie-rod solenoid, comprises a first stator having a first exciter coil, and comprises an armature as a drive element, that the armature is provided with a measuring coil having a measuring voltage applied to it when the armature is passed through by a magnetic flow generated by the first exciter coil, and that the first exciter coil and the measuring coil are connected to the evaluating and control unit, wherein the evaluating and control unit is adapted to control, or feedback-control, the force by which the drive element of the actuator is movable in the direction toward the first stator, and/or the deflection movement of the drive element from its rest position as well as the return movement of the drive element into its rest position.

This embodiment of the invention advantageously allows for a relatively precise and inexpensive force measurement in an actuator, designed as a solenoid, for the haptic feedback of operating elements.

The solenoid herein can be designed as a single-type tied rod or as a dual tie rod.

For haptic feedback, there is often used, as an actuator—for reasons of the installation space and the costs—a solenoid (tie-rod magnet) without permanent magnets. Thus, the stator of such a tie-rod magnet is to be operated electromagnetically. In order to be able to set the desired movement of the operating surface of the operating element, the temporal development of the force at the actuator must be precisely settable. Further, it can be required that the force by which the operating element is moved back and forth, is each time generated actively. This can be realized by means of a dual tie rod magnet with a common tie rod between two electromagnetic stators.

With slowly varying magnetic fields, the force of a solenoid substantially depends on the armature current and on the air gap between the tie rod and the stator. The force development in case of the haptic feedback, however, is very dynamic and includes frequency components above 1 kHz. Herein, the interrelationship between the current and the force in normally used machining steel or electrical sheets for magnetic flux conductance is not trivial and can be described only by very complex modelling. A further problem resides in that, due to the mechanical tolerances and the movement of the operating surface, the air gap is not exactly known so that the force effect of a tie rod magnet can be estimated only roughly.

By use of the herein described approach of measuring the magnetic flux passing through the tie rod by means of a measuring coil and the induced voltage that is decreasing at this coil, it is now rendered possible to control or feedback-control the force and the movement of the tie rod. Further, the movement of the tie rod can be damped in a well-aimed manner, thus making it possible to avoid an overshoot in the respective end position of the back and forth movement of the tie rod.

As already explained above, an additional advantage can be achieved if the tie-rod solenoid is arranged between two electromagnetically operated stators. Thus, in this embodiment of the invention, the tie-rod comprises a second stator having a second exciter coil, wherein the two stators are arranged on both sides of the armature and also the second exciter coil is connected to the evaluating and control unit, wherein, by means of the evaluating and control unit, there can be controlled or feedback-controlled the respective force by which the armature is movable in the respective direction toward the first stator and respectively the second stator, and/or the deflection movement of the armature from its rest position as well as the return movement of the armature into its rest position.

Figure 2:
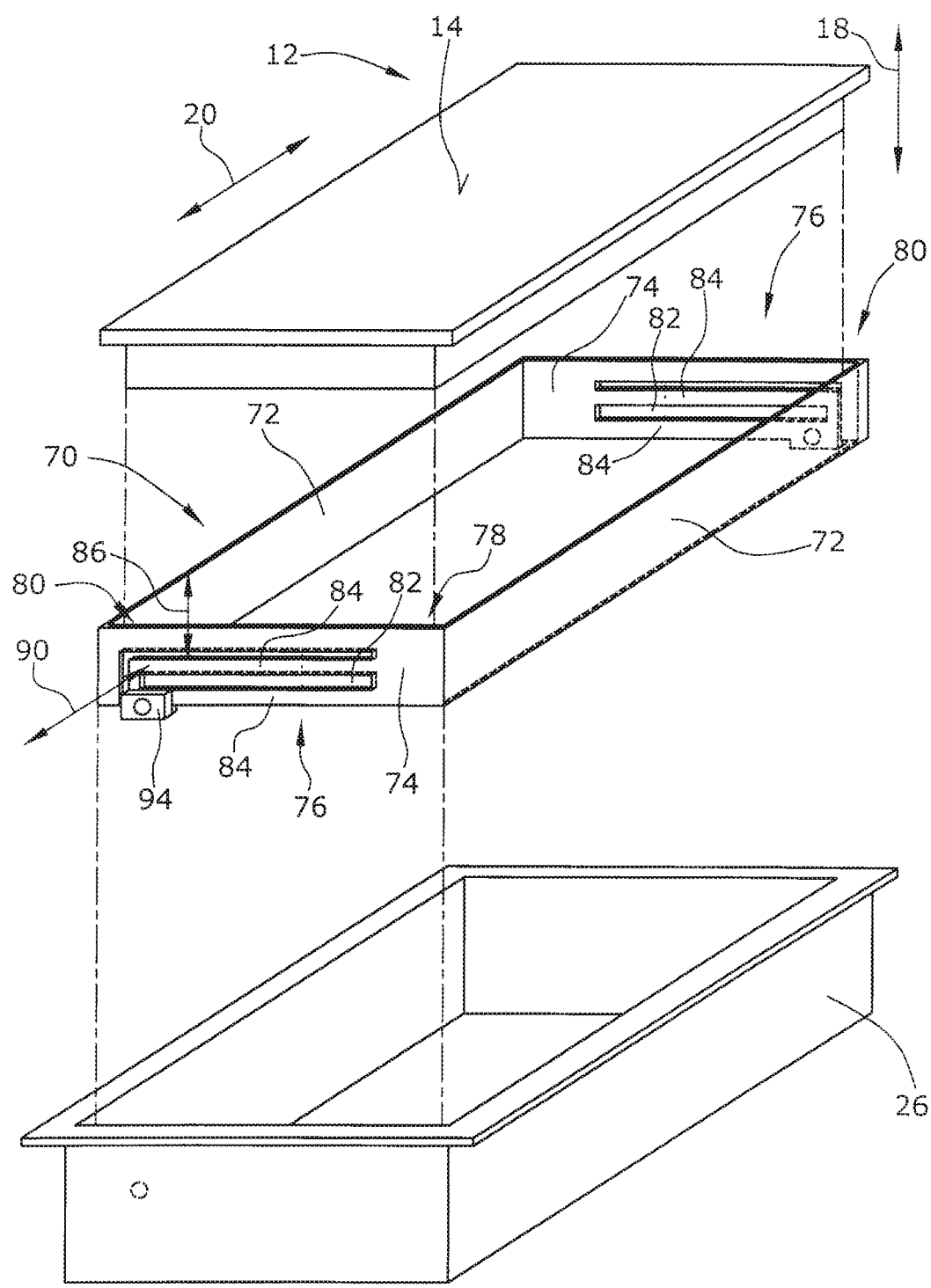
Figure 3:
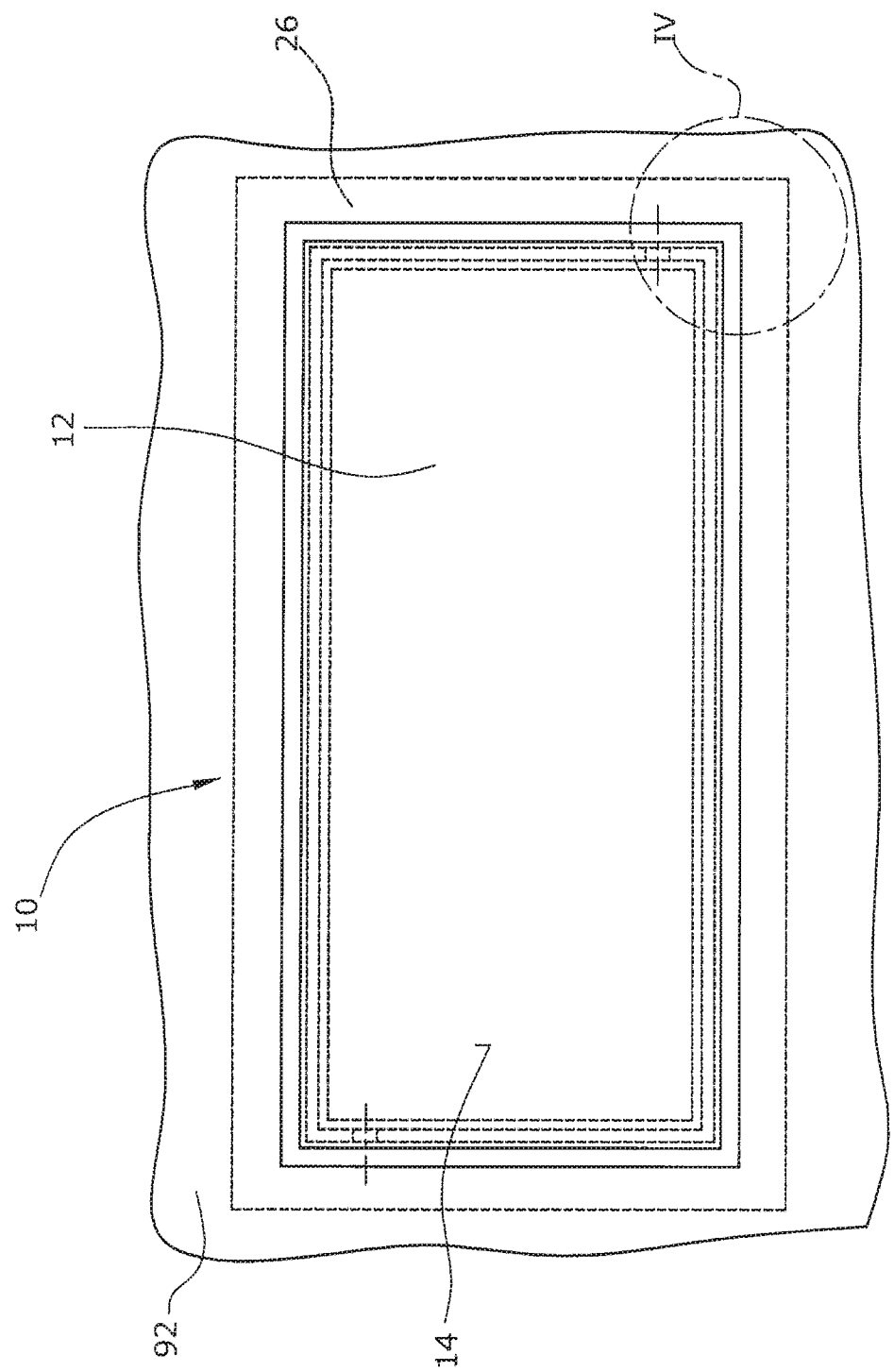
Figure 4:
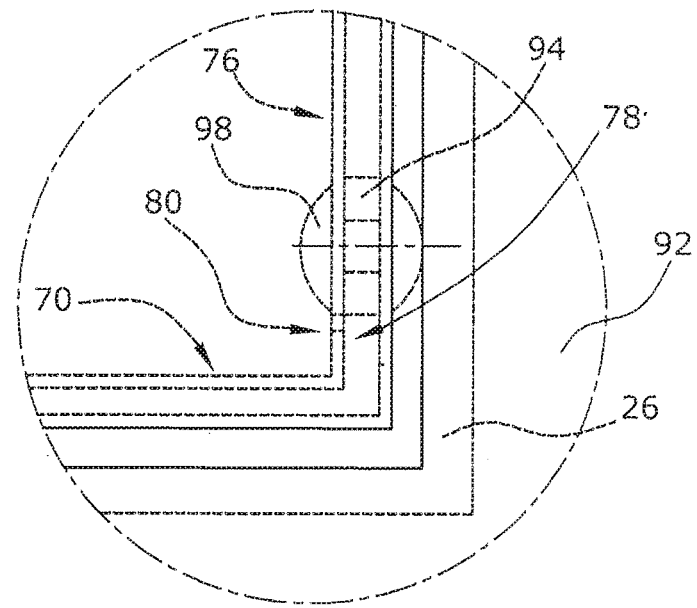
Figure 5:
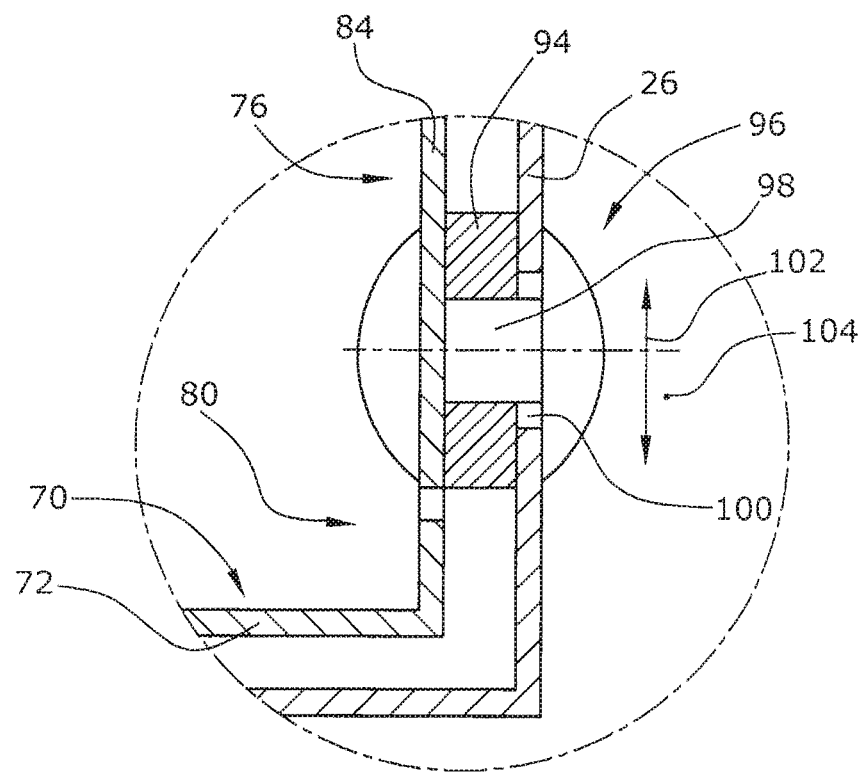
Figure 6:
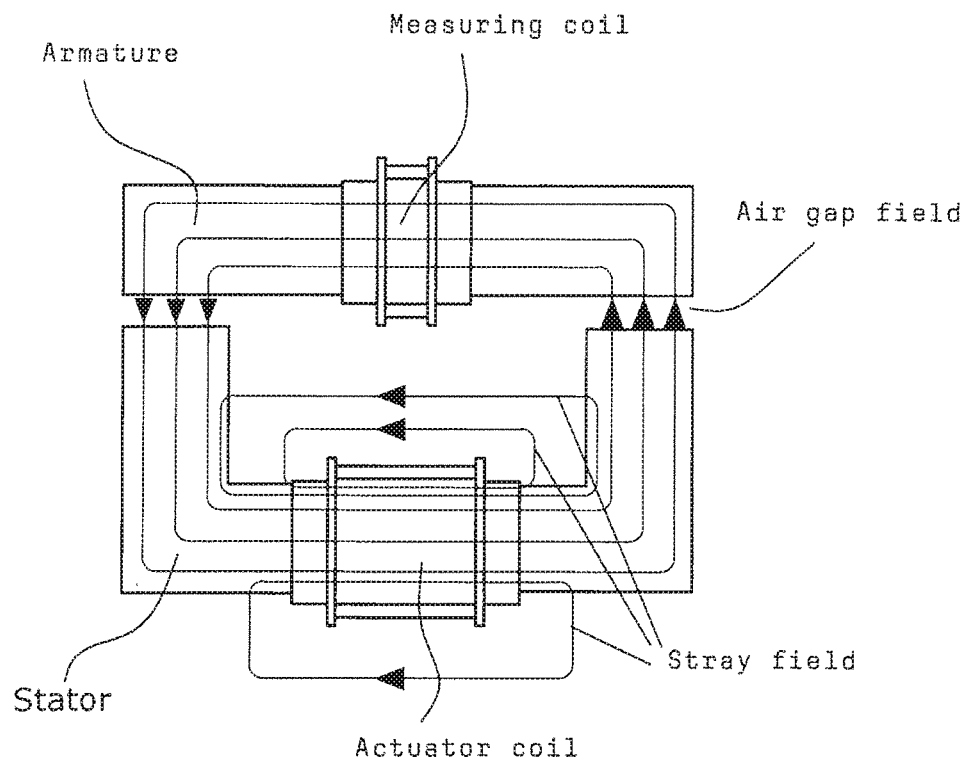
Figure 7:
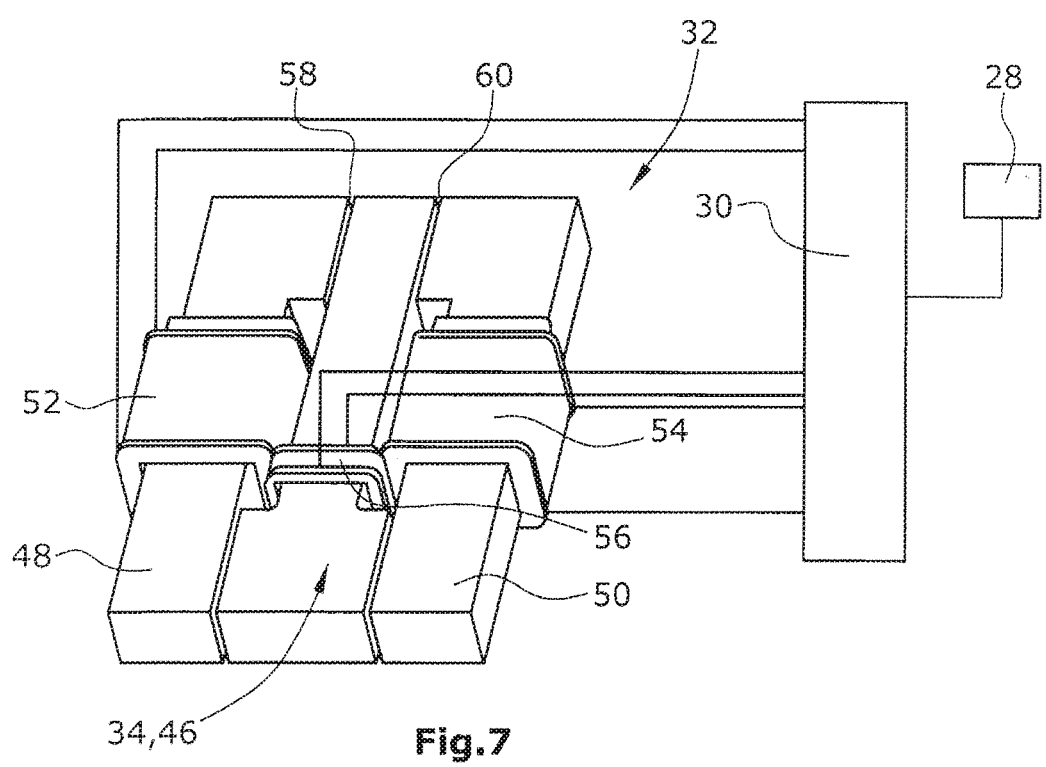
Figure 8:
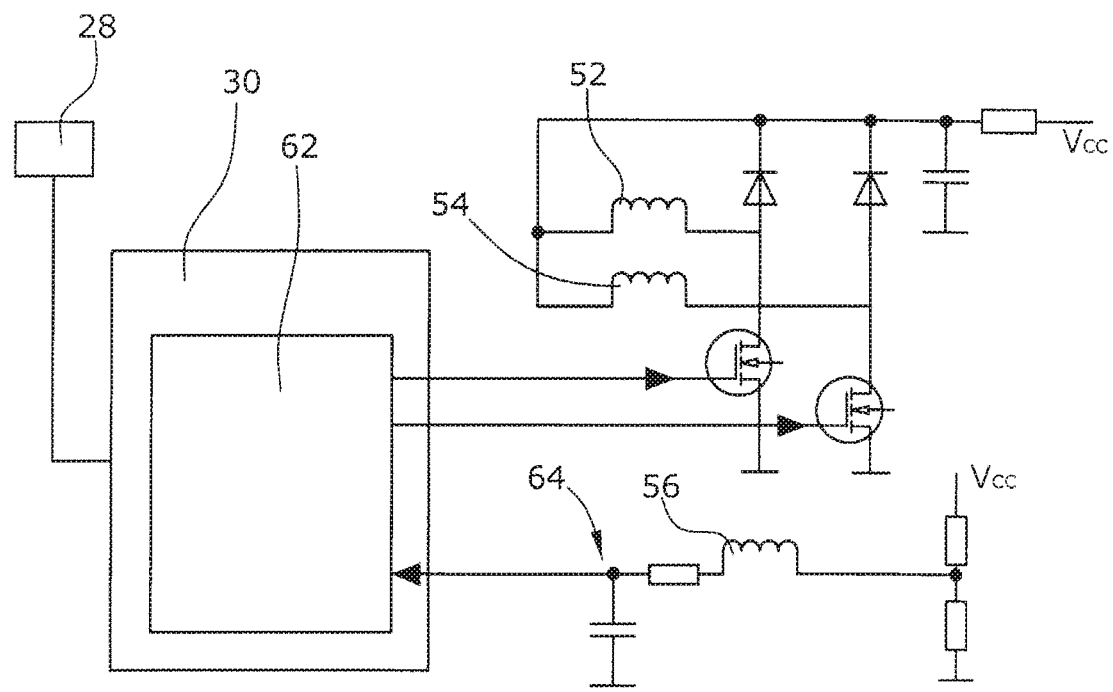

The invention will be explained in greater detail hereunder by way of an exemplary embodiment and with reference to the drawing. The following is shown:

FIG. 1 is a schematic and lateral view of an operating unit for a vehicle component comprising an operating element designed as a display element, and with spring-elastic support and active haptic feedback for actuation of the operating element, FIG. 2 is an exploded view for illustrating the connection of the operating element to the housing by means of a spring frame that realizes both the vertical and the lateral elastic coupling of the operating element, FIG. 3 is a plan view of the operating unit for illustrating the manner in which the gap is maintained during assembly of the operating unit, FIG. 4 is an enlarged representation of the area marked by IV in FIG. 3, FIG. 5 is a still further enlarged representation of the area IV in FIG. 3 for illustrating the tolerance compensation during the fixing of the spring frame to the housing, FIG. 6 is a representation of a solenoid designed as a tie rod magnet with stator and armature, for general illustration of the electromagnetically relevant properties of such a solenoid, FIG. 7 is a perspective view for illustrating the actuator designed as a dual solenoid, for the active haptic feedback, and FIG. 8 is a view of a possible circuitry of the solenoid according to FIG. 7.

In FIG. 1, there is shown, in lateral view and schematic representation, an operating unit 10 comprising an operating element 12. In this exemplary embodiment, the operating element 12 is designed as a display assembly comprising an operating surface 14 adapted to display a large number of symbol fields 16. Normally, the operating element 12 is backlighted.

For performing an actuating movement in a vertical moving direction (see the double arrow 18) and for confirmation of such an actuating movement in lateral direction (see the double arrow 20 in FIG. 1), the operating element 12 is elastically supported on a housing 26 via first and second springs 22, 24 schematically outlined in FIG. 1, which springs will still be explained in greater detail. By means of a sensor 28, it can be sensed that the operating element 12 has moved along a vertical axis of movement 18. This is detected in an evaluating and control unit 30, whereupon the latter will control an actuator 32 designed as a solenoid and comprising a drive element 34. The fixed stator portion 36 of actuator 32 is supported on the housing 26 while the drive element 34 of actuator 32 is mechanically coupled to operating element 12 (or vice versa). The axis of effective movement of drive element 34 is illustrated by the double arrow 38.

The larger and more complex the operating element 12 is designed, the heavier it is and the more installation space it occupies. If, now, it is desired that the haptic feedback shall be equal across the entire operating surface 14, the operating element 12 should perform exclusively a translational movement during the haptic feedback. Theoretically, this could be achieved in the simplest manner by providing that the drive element 34 of actuator 32 engages at the center of mass 40 of operating element 12. This, however, is not possible due to the limited installation space.

If one intends to make it possible nonetheless that, during active haptic feedback, the operating element 12 will move exclusively in a translational manner, a technically relatively simple solution consists in arranging the actuator 32 such that the center of mass 40 of operating element 12 is situated on the axis of effective movement 38 of the drive element 34 of actuator 32. This is shown in FIG. 1, while FIG. 1 also illustrates how the operating element 12 is actively moving when an actuating movement is detected and the actuation of the operating element 12 is reconfirmed by haptic feedback. In this context, it is still to be noted that the second spring elements 24 and respectively their spring effective axes 42 are in the ideal case arranged in a plane 44 in which also the center of mass 40 is situated.

Substantially orthogonal to this plane 44, there extends that plane which is spanned by the lateral axis of movement 20 of operating element 12 and by the axis of effective movement 38 of the drive element 34 of actuator 32. Relative to FIG. 1, this plane is the plane of the drawing.

Thus, the purely translational movement of the operating element 12 during the active haptic feedback comprises both a lateral component and a vertical component. The fact that this feedback movement is not purely lateral, does not play a role for the wish that the haptic feel should be identical across the entire operating surface 14 of operating element 12. What is decisive is that, during active haptic feedback, the operating element 12 is not subjected to any rotatory movement components so that, in this regard, there will advantageously occur exclusively a parallel displacement of the operating element 12 in space.

Hereunder, the elastic connection/mounting of the operating element 12 to the housing 26 of operating unit 10 will be explained. A special aspect in this regard resides in that the two springs 22, 24 schematically shown in FIG. 1 are realized by a spring frame 70. The spring frame 70 is shown in the exploded view of FIG. 2.

The spring frame 70 is preferably made of metal and particularly of aluminum and has a substantially rectangular shape. Spring frame 70 comprises two longitudinal frame sections 72 and two transverse frame sections 74 extending transversely to them. The longitudinal frame sections 72 extend transversely to the lateral axis of movement 20 of operating element 12, while the transverse frame sections 74 extend transversely to the lateral axis of movement 20. In the two transverse frame sections 74 of spring frame 70, leaf spring arms 76 are formed that have a first end 78 at which they are connected to spring frame 70, and a free second end 80. The two leaf spring arms 76 extend in respective vertical planes that run parallel to the vertical axis of movement 18. The leaf spring arms 76 are "cut free" within the transverse frame sections 74 and further each comprise a respective cutout 82 continuously closed on all sides, so that each leaf spring arm 76 comprises two leaf spring webs 84 that are rigidly connected to each other at their ends 78, 80. As can further be seen in FIG. 2, the two leaf spring arms 76 are arranged in opposite senses to each other.

When, now, the operating element 12 is actuated, it will be moved, with accompanying deflection of the leaf spring arms 76, in the direction of the vertical axis of movement 18, namely against the bending force in the direction of arrow 86 applied by the leaf spring arms 76. In this effective direction (force sense), the leaf spring arms 76 are in a relatively stiff state, which is of advantage for the haptic feel.

When, now, the haptic feedback occurs due to the actuation of the operating element 12, the operating element 12 will be mechanically excited (force feedback) in the direction of the lateral axis of movement 20, which has the result that the leaf spring arms 76 will now elastically deflect in the direction of arrow 90. In this situation, the leaf spring arms 76 also fulfill the function of a bending bar, wherein, when moving in the direction of arrow 90, they can act in a less stiff manner than in the direction of arrow 86. Thus, advantageously, both elastic support functions of operating element 12 are realized by a sole element, namely by the spring frame 70.

After all, the stiffnesses of the system in the force sense direction and in the force feedback direction are dependent on the masses. Generally, the force feedback direction does not have to be less stiff. The force sense stiffness is a result of the working range of the sensors. Thus, for instance, an optical sensor needs a certain stroke working range as to be able to fulfill its function. The force feedback stiffness is to be seen principally as dependent on the mass and the energy for control.

In FIG. 3, it can be seen, in plan view onto the operating unit 10, that the operating element 12 comprises a gap clearance, substantially uniform on all sides, toward the area surrounding the operating unit 10, e.g. an instrument panel 92.

FIG. 4 shows a portion of FIG. 3 in an enlarged scale. It is evident that the spring frame 70 is fastened at the free second end 80 of a leaf spring arm 76 to the inner side of housing 26, notably at a distance via a spacing projection 94 at the second free end 80. For better survey, the operating element 12 is not shown in FIG. 4.

The connection of the leaf spring arm 76 to the housing 26 is shown, at a still more enlarged scale, in FIG. 5. On the free second end 80 of a leaf spring arm 76, there is arranged at least one fastening element 96 in form of a rivet 98 extending through the housing 26 with play. In housing 26, a receiving opening 100 is formed, with the rivet 98 extending through it. By displacing the spring frame 70 and/or the housing 26 relative to each other (see the double arrow 102 in FIG. 5), notably prior to tightening the rivet 98, it is now possible to set the gap size on the longitudinal frame sections 72 of spring frame 70 and thus at the corresponding longitudinal edge section of operating element 12 so that the gap size will be the same on both longitudinal sides. By relative displacement of the two above mentioned elements vertically to the plane of the drawing according to FIG. 5 (see the direction of movement 104 represented by a dot), the mounting of operating element 12 can be adjusted to the effect that its operating surface 14 will be flush with the adjacent surface area of the instrument panel 92 (see also FIG. 1). An equalization of the gap sizes on the transverse edges of operating element 12 will occur automatically since the spring frame 70 fastened to housing 26 will be automatically centered in the direction of the lateral axis of movement 20.

As already described further above, it is often the case, especially for reasons of the installation space and the costs, that the actuator for the haptic feedback of operating elements is realized by use of a solenoid. The force applied by this solenoid can be estimated only with increased complexity and is quite essentially dependent on the current and the air gap of the solenoid. The conditions that are valid in this regard for a solenoid will explained hereunder with reference to FIG. 6.

In FIG. 6, a solenoid is shown whose stator and armature are made of highly permeable materials (usually machining steel or electrical sheets), and whose magnetic field is built up by means of an energized exciter coil.

The force of such a solenoid is usually calculated from the exciter current and the air gap size. The force development in case of the haptic feedback, however, is very dynamic, with frequency components above 1 kHz. Here, the interrelationship between the current and the force in the machining steel or electrical sheets normally used for magnetic flux conductance is not trivial and can be described only by very complex modelling. To this, there is added the circumstance that, due to the mechanical tolerances and the movement of the operating surface, the air gap is not exactly known and, thus, the effective force of the actuator can be estimated only roughly. By use of "Maxwell's traction formula" and a measuring coil for detection of the magnetic flux density in the air gap, this problem can be avoided, wherein a voltage measurement can normally be realized at a lesser expense than a current measurement:

$$F = \frac{B_L^2 A_L}{2\mu_0}$$

(F—actuator force, $\mu_0$—air permeability, $A_L$—air gap surface, $B_L$—magnetic flux density in the air gap)

The relatively low inhomogeneity of the air gap flux density in practical realizations can be accounted for by a correction factor, which in turn leads to a simple realization of a force measurement by means of a measuring coil:

$$F(t) = \frac{C}{2\mu_0 A_L}\left(\frac{1}{N_{MS}}\int_0^t u(t')dt'\right)^2$$

(t—time, C—air gap correction factor, $N_{MS}$—number of windings of the measuring coil, u(t)—induced voltage in the measuring coil)

The integration of the induced voltage can be performed digitally in a microcontroller that normally will already exist in the system. Thus, the force will be known at any point of time of the controlling.

FIG. 7 shows the actuator 32 in perspective view. This actuator 32 is designed as a dual solenoid whose drive element 34, being an armature 46 arranged between a first stator 48 and a second stator 50, can build up a force in two opposite directions along the axis of effective movement 38.

The first and the second stator 48, 50 are fastened to the housing 26 while the armature 46 is tightly connected to operating element 12. The first stator 48 comprises a first exciter coil 52 while the second stator 50 is provided with a second exciter coil 54. The armature 46 is surrounded by a measuring coil 56. On both sides of armature 46, a first and respectively second air gap 58, 60 is arranged. Since the force acting on armature 46 shall be directed respectively in one direction, the exciter coils 52, 54 are accordingly energized not simultaneously but alternately. By the configuration of the measuring coil 56 at the armature 46, there is rendered possible a precise and inexpensive force measurement in both effective directions along the axis of effective movement 38.

Control and evaluation of the voltage induced in the measuring coil 56 can be performed e.g. by a microcontroller 62 that can be a part of the evaluating and control unit 30. An example of the connection with the microcontroller 62 is shown in FIG. 8. The induced voltage in the measuring coil 56 will first be smoothed by a simple lowpass 64 so as to eliminate, from the measuring signal, the PWM clocking (frequency normally >20 kHz) for alternate control of the two exciter coils 52, 54. Subsequently, the microcontroller 62 will detect the induced voltage and integrate it digitally. The limit frequency of the lowpass 64 should be sufficiently higher than the highest frequency components of the force development.

LIST OF REFERENCE NUMERALS

10 operating unit
12 operating element
14 operating surface of operating element
16 symbol fields
18 vertical axis of movement of operating element
20 lateral axis of movement of operating element
22 spring elements
24 spring elements
26 housing
28 sensor
30 control unit
32 actuator
34 drive unit of actuator
36 stator portion of actuator
38 axis of effective movement of actuator
40 center of mass of operating element
42 spring effective axis
44 plane
46 armature
48 stator
50 stator
52 exciter coil
54 exciter coil
56 measuring coil
58 air gap
60 air gap
62 microcontroller
64 lowpass
70 spring frame
72 longitudinal frame sections of spring frame
74 transverse frame sections of spring frame
76 leaf spring arms
78 first end of a leaf spring arm
80 second end of a leaf spring arm
82 cutout
84 leaf spring webs of a leaf spring arm
86 movement arrow
90 movement arrow
92 instrument panel
94 spacing projection
96 fastening element
98 rivet
100 receiving opening
102 lateral tolerance compensation
104 vertical tolerance compensation

The invention claimed is:

1. An operating unit for a vehicle, particularly an infotainment system for controlling diverse vehicle components, comprising
a housing having a front side,
an operating element arranged on the front side of the housing, which has an operating surface,
wherein the operating element is mounted in a spring-elastic manner on and/or in the housing along a vertical axis of movement extending substantially orthogonally to the operating surface and along a lateral axis of movement extending substantially transversely to the vertical axis of movement,
at least one sensor for detecting an actuating movement of the operating element in the direction of the vertical axis of movement,
an actuator arranged in and/or on the housing for feedback movement of the operating element at least also in the lateral axis of movement upon a detected actuating movement of the operating element, wherein the actuator comprises an electromagnetically controllable drive element mechanically coupled to the operating element and being movable forth and/or back,
an evaluating and control unit connected to the sensor and the actuator, and
a spring frame for spring-elastic support of the operating element,
wherein the spring frame comprises two transverse frame sections extending transversely to the lateral axis of movement and each having at least one leaf spring arm arranged in it,
wherein each leaf spring arm comprises a first end connected to the spring frame and a free second end,
wherein each leaf spring arm extends in a vertical plane and the lateral axis of movement extends transversely to said vertical plane,
wherein each leaf spring arm is also spring-elastic in the vertical plane, and
wherein the operating element is fixed to the spring frame outside the leaf spring arms of the spring frame, and the free second ends of the leaf spring arms of the spring frame are fixed to the housing.

2. The operating unit according to claim 1, wherein each leaf spring arm comprises at least one cutout, closed on all sides, for forming at least two leaf spring webs.

3. The operating unit according to claim 2, wherein the spring frame is rectangular and comprises two longitudinal frame sections extending parallel to the lateral axis of movement of the operating element, and two transverse frame sections extending transversely to the lateral axis of movement and each having at least one leaf spring arm formed on and/or in them.

4. The operating unit according to claim 1, wherein the spring frame is rectangular and comprises two longitudinal frame sections extending parallel to the lateral axis of movement of the operating element, and two transverse frame sections extending transversely to the lateral axis of movement and each having at least one leaf spring arm formed on and/or in them.

5. The operating unit according to claim 1, wherein the two leaf spring arms are oriented in a mutually identical configuration or in opposite senses to each other.

6. The operating: unit according to claim 1, wherein the free end of each leaf spring arm and/or the housing comprises at least one receiving opening for a fastening element, extending through the receiving opening, for fastening the respective leaf spring arm to the housing, wherein, for compensation of mounting tolerances, the fastening element extends through the receiving opening with play.

7. The operating unit according to claim 1, wherein the operating element has a center of mass, that the drive element of the actuator is movable back and forth along an axis of effective movement, and wherein the center of mass of the operating element is situated on, or substantially on, the axis of effective movement of the drive element of the actuator.

8. The operating unit according to claim 7, wherein the lateral axis of movement of the operating element and the effective axis of movement of the drive element of the actuator are arranged to span a common vertical plane oriented substantially orthogonally to the operating surface.

9. The operating unit according to claim 8, wherein, below the operating element, the housing comprises an installation space and wherein the actuator, for obtaining a smallest possible angle between the effective axis of movement of the drive element of the actuator and the lateral axis of movement of the operating element, is arranged below the operating element as closely as allowable by the installation space, and/or is arranged as remote from the center of mass of the operating element as allowable by the installation space.

10. The operating unit according to claim 7, wherein, for realizing the lateral movement, the leaf spring arms of the spring frame have spring effective axes that are situated on the lateral axis of movement or in a plane extending substantially orthogonally to the plane spanned by the axis of effective movement of the drive element of the actuator and by the lateral axis of movement of the operating element and are arranged symmetrically to the lateral axis of movement.

11. The operating unit according to claim 7, wherein the actuator, as a tie-rod solenoid, comprises a first stator having a first exciter coil, and comprises an armature as a drive element, that the armature is provided with a measuring coil having a measuring voltage applied to it when the armature is passed through by a magnetic flow generated by the first exciter coil, and wherein the first exciter coil and the measuring coil are connected to the evaluating and control unit, wherein, by means of the evaluating and control unit, there can be controlled or feedback-controlled the force by which the armature is movable in the direction toward the first stator, and/or the deflection movement of the armature from its rest position as well as the return movement of the armature into its rest position, wherein it can be particularly provided, that the tie-rod solenoid comprises a second stator having a second exciter coil, wherein the two stators are arranged on both sides of the armature and also the second exciter coil is connected to the evaluating and control unit, wherein the evaluating and control unit is adapted to control, or to feedback-control, the respective force by which the armature is movable in the respective direction toward the first stator and respectively the second stator, and/or the deflection movement of the armature from its rest position as well as the return movement of the armature into its rest position.

* * * * *